(12) United States Patent
Shin

(10) Patent No.: US 6,880,936 B2
(45) Date of Patent: Apr. 19, 2005

(54) MICRO MIRROR DEVICE AND PROJECTOR EMPLOYING THE SAME

(75) Inventor: Hyung-jae Shin, Seongnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 185 days.

(21) Appl. No.: 10/259,563

(22) Filed: Sep. 30, 2002

(65) Prior Publication Data

US 2004/0114110 A1 Jun. 17, 2004

(30) Foreign Application Priority Data

Oct. 9, 2001  (KR) ........................................ 2001-62077

(51) Int. Cl.[7] ........................... G03B 21/28; G02F 1/00; G02B 26/00
(52) U.S. Cl. ........................ 353/99; 359/291; 359/295; 348/771
(58) Field of Search ........................ 353/98, 99, 30–33; 348/771, 755–758; 359/290–292, 295, 298, 872–874, 876, 877, 881

(56) References Cited

U.S. PATENT DOCUMENTS

| | | | | |
|---|---|---|---|---|
| 5,673,139 A | * | 9/1997 | Johnson | 359/291 |
| 6,147,790 A | * | 11/2000 | Meier et al. | 359/291 |
| 6,198,180 B1 | * | 3/2001 | Garcia | 310/36 |
| 6,480,320 B1 | * | 11/2002 | Nasiri | 359/291 |
| 6,512,625 B1 | * | 1/2003 | Mei et al. | 359/290 |
| 6,540,361 B1 | * | 4/2003 | Hayashi | 353/31 |
| 6,552,840 B1 | * | 4/2003 | Knipe | 359/291 |
| 6,781,731 B1 | * | 8/2004 | Choi | 359/223 |

* cited by examiner

Primary Examiner—Judy Nguyen
Assistant Examiner—Andrew Sever
(74) Attorney, Agent, or Firm—Sughrue Mion, PLLC

(57) ABSTRACT

A micro mirror device having a micro mirror that can slant with regard a plurality of rotation axes, and a projector employing such a micro mirror device, are provided. This micro mirror device includes a substrate; a plurality of address electrodes formed on the substrate, and a bias electrode for making the micro mirrors slant with regard to a plurality of rotation axes, together with the address electrodes; and a holding plate including a central portion for supporting a second post that supports the micro mirrors and at least one spring hinges transforming elastically when the micro mirrors slant with regard to the rotation axes, the holding plate held by first posts of predetermined numbers which are formed on the bias electrode. The projector includes a light source for illuminating light; a light separator for branching light output from the light source into several beams according to a wavelength region, and reflecting or transmitting the beams at different angles; a micro mirror device for forming an image by rotating a micro mirror, which slants with regard to a plurality of rotation axes, in a predetermined direction or at a predetermined angle, and by selectively reflecting the beams separated from the light separator; and a projection lens unit for magnifying and transmitting beams output from the micro mirror device, so that the beams travel toward a screen.

35 Claims, 11 Drawing Sheets

MICRO MIRROR DEVICE AND PROJECTOR EMPLOYING THE SAME

BACKGROUND OF THE INVENTION

This application claims the priority of Korean Patent Application No. 2001-62077, filed Oct. 9, 2001 in the Korean Intellectual Property Office, which is incorporated herein in its entirety by reference.

1. Field of the Invention

The present invention relates to a micro mirror device for changing the reflection path of incident light by a micro mirror, and a projector employing the same, and more particularly, to a micro mirror device that can slant with regard to a plurality of rotation axes and thus realizes color images without color wheel, and a projector employing such a micro mirror device.

2. Description of the Related Art

In general, a micro mirror device includes a plurality of micro mirrors actuated by an electrostatic attraction, and changes the reflection path of light by changing the reflection angle according to the inclination angle or direction of each micro mirror. Such a micro mirror device can be applied to an image display of a projection television and optical scanning devices used in a scanner, a copy machine or a facsimile. In particular, the micro mirror is two dimensionally arranged equal to pixels in number, being used in an image display device, and further produces an image by individually actuating each micro mirror in response to image signals for pixels and then determining the reflection angle of light.

Referring to FIG. 1, a conventional micro mirror device 115 includes a substrate 100; a pair of address electrodes 101 and a pair of bias electrodes 102 facing each other on the substrate 100; a micro mirror 106 supported by posts 105; and torsion hinges 110 that is installed between the micro mirror 106 and the posts 105, and given torsion when the micro mirror 106 is inclined. When voltage is applied to the bias electrodes 102, the voltage is transmitted to the micro mirror 106 via the posts 105 and the torsion hinges 110. Also, if voltage is applied to one of a pair of address electrodes 101, an electrostatic attraction is generated due to a difference in an electric potential between the one address electrode 101 and the micro mirror 106, and thus, the micro mirror 106 rotates due to the electrostatic attraction with regard to the torsion hinges 110. To the contrary, if a difference in the electric potential,disappears between the address electrode 101 and the micro mirror 106, the micro mirror 106 returns back to its original position, i.e., it does not slant in a certain direction and balances itself, due to the restoring force of the torsion hinges 110. Here, it is determined that the micro mirror 106 is switched 'on' for a predetermined color in the event that the micro mirror 106 slopes in a certain direction with regard to the torsion hinges 110, and the micro mirror 106 is switched 'off' for the predetermined color in the event that the micro mirror 106 slopes in the opposite direction with regard to the torsion hinges 110.

FIG. 2 is a view of a projector employing a conventional micro mirror device as illustrated in FIG. 1. Referring to FIG. 2, a beam is emitted from a light source 120, focused by a first condenser 122, and incident upon a color wheel 125. Here, a color image is realized by sequentially illuminating beams of three colors, i.e., R(red), G(green), B(blue) beams, on the micro mirror device 115 by rotating the color wheel 125 at high speed. That is, the R, G, B beams pass through the color wheel 125 and a second condenser 127, sequentially, and are then incident upon the micro mirror device 115 having the micro mirrors 106 equal to pixels in number. Then, when the micro mirror device 115 is switched 'on' or 'off' in response to an image signal for each pixel, and each micro mirror 106 is inclined in a certain direction, a color beam corresponding to each pixel is reflected on the micro mirror 115 at a certain angle and travels toward a projection lens unit 133. Next, the beam is enlarged by the projection lens unit 133 and forms an enlarged image on a screen 135.

At this time, the color wheel 125 rotates at high speed, which would make noise and the color wheel 125 to operate unstably. Further, it is impossible to rotate the projector beyond a predetermined speed due to its mechanical limitation, thereby causing color breakup. Also, light may be lost at the filter border of the color wheel 125, and therefore, light must be concentrated to a very small sized beam to prevent this problem. However, since there is a limitation in reducing light to a beam size, it is impossible to completely prevent a loss in light. Further, a color wheel is very expensive, thereby increasing manufacturing cost.

SUMMARY OF THE INVENTION

To solve the above problems, it is a first object of the present invention to provide a micro mirror device including micro mirrors that can be inclined with regard to a plurality of rotation axes, and thus is capable of realizing color images without a color wheel.

To achieve an aspect of the above object, there is provided a micro mirror device capable of individually controlling a plurality of micro mirrors, the micro mirror device including a substrate; a plurality of address electrodes formed on the substrate, and a bias electrode for making the micro mirrors slant with regard to a plurality of rotation axes, together with the address electrodes; and a holding plate including a central portion for supporting a second post that supports the micro mirrors and at least one spring hinges transforming elastically when the micro mirrors slant with regard to the rotation axes, the holding plate held by first posts of predetermined numbers which are formed on the bias electrode.

The address electrodes are aligned to face each corners of the micro mirrors.

At least one spring hinge may be positioned in the diagonal direction of the micro mirror with regard to the central portion in the diagonal direction of the micro mirror. Also, at least one spring hinge may be positioned parallel to each side of the micro mirror with regard to the central portion. Otherwise, spring hinges may extend from each side of the central portion.

The holding plate comprises stoppers for preventing the inclination of the micro mirror beyond a predetermined angle.

The address electrodes are positioned parallel to each side of the micro mirror.

To achieve another aspect of the above object, there is provided a micro mirror device capable of individually controlling a plurality of micro mirrors, the micro mirror device including a substrate; a plurality of address electrodes formed on the substrate, and a bias electrode for making the micro mirrors slant with regard to a plurality of rotation axes, together with the address electrodes; and a holding plate including a rigid portion held by first post of predetermined numbers which are formed on the bias electrode, a central portion for supporting a second post that supports the micro mirror, at least one spring hinge connected between the rigid portion and the central portion, the spring hinge transforming elastically when the micro mirror slants with regard to a plurality of rotation axes.

At least one spring hinge has the same restoring force with regard to the rotation axes.

The rigid portion is formed to enclose the central portion and polygonal shaped. Also, the rigid portion includes stoppers for preventing the inclination of the micro mirror beyond a predetermined angle.

To achieve still anther aspect of the above object, there is provided a projector including a light source for illuminating light; a light separator for branching light output from the light source into several beams according to a wavelength region, and reflecting or transmitting the beams at different angles; a micro mirror device for forming an image by rotating a micro mirror, which slants with regard to a plurality of rotation axes, in a predetermined direction or at a predetermined angle, and by selectively reflecting the beams separated from the light separator; and a projection lens unit for magnifying and transmitting beams output from the micro mirror device, so that the beams travel toward a screen.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 3:
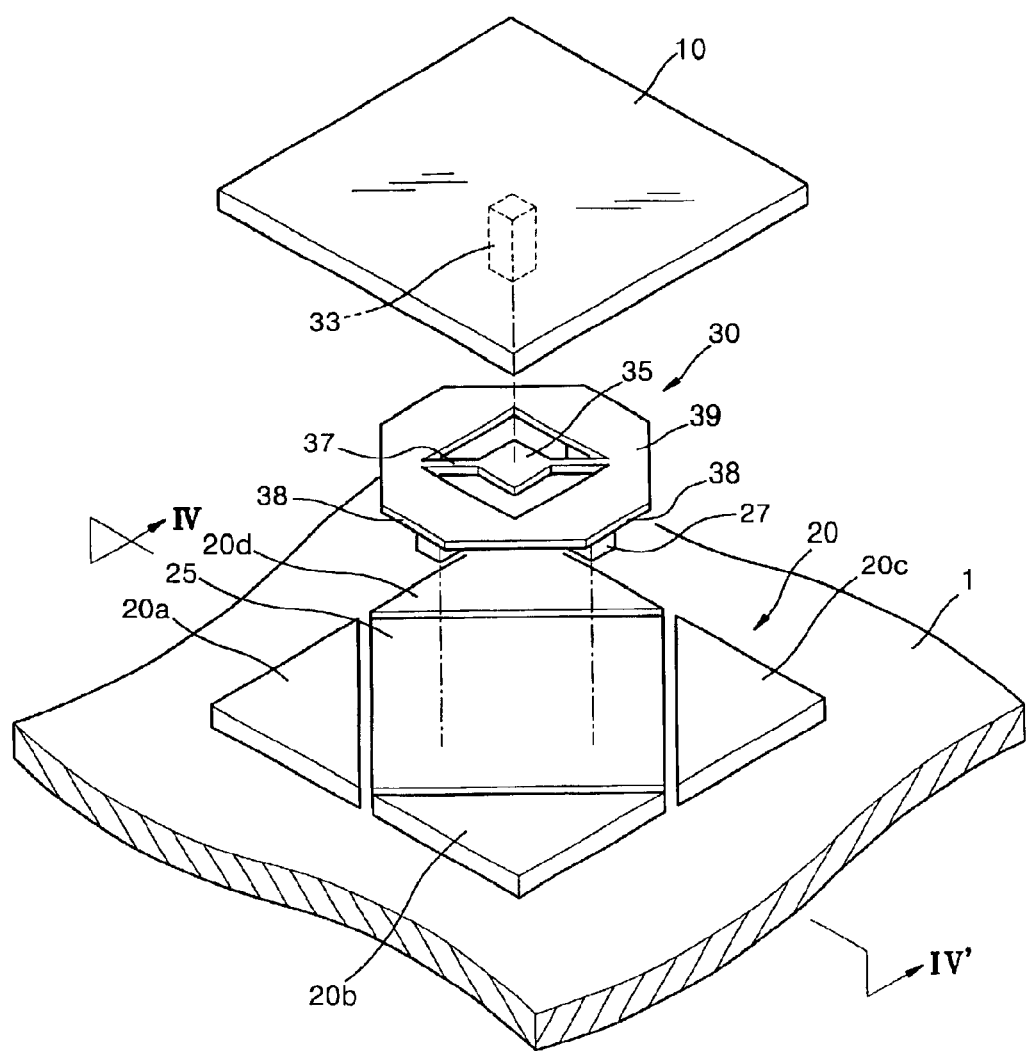
FIG. 3 is an exploded perspective view of a first embodiment of a micro mirror device according to the present invention.
Figure 4:
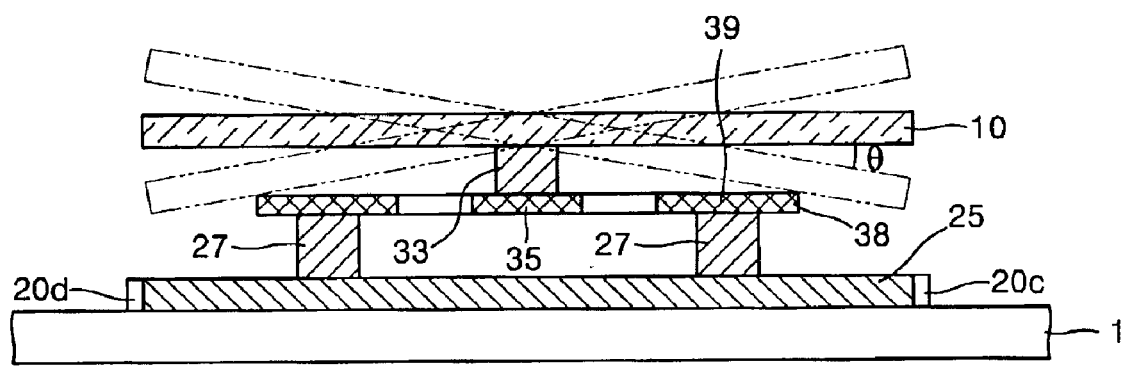
FIG. 4 is a cross-sectional view of the micro device of FIG. 3, taken along the line IV–IV'.

Referring to FIGS. 3 and 4, a micro mirror device according to the present invention includes a substrate 1; a micro mirror installed to be inclined with regard to a plurality of rotation axes; a plurality of address electrodes 20; a bias electrode 25 for actuating the micro mirror 10 by generating an electrostatic attraction, together with the address electrodes 20; and a holding plate 30 installed between the micro mirror 10 and the bias electrode 25.

The holding plate 30 may be supported by first posts 27 of predetermined numbers which are installed on the bias electrode 25, and includes a central portion 35 that supports a second post 33 for holding the micro mirror 10, and at least one spring hinge 37 that transforms elastically when the micro mirror 10 slopes at a certain angle.

Here, a rigid portion 39 may be further installed around the spring hinge 37 so as to secure the elasticity of the spring hinge 37. Therefore, the holding plate 30 may include the central portion 35 for supporting the second post 33, a rigid portion 39 held by the first posts 27 of predetermined numbers, and at least one spring hinge 37 connected between the central portion 35 and the rigid portion 39. The rigid portion 39 is formed to enclose the central portion 35. The shape of the rigid portion 39 is determined in consideration of its surface facing the address electrodes 20 and the micro mirror 10. The rigid portion 39 may be polygonal or round shaped, for example.

Also, the holding plate 30 includes stoppers 38 for preventing the micro mirror 10 from sloping beyond a predetermined angle θ. The stoppers 38 are positioned to contact the bottom of the micro mirror 10 when the micro mirror 10 is inclined at more than a predetermined angle θ.

Meanwhile, if voltage is applied to the bias electrode 25, the given voltage is transmitted to the micro mirror 10 via the first posts 27, the spring hinges 37, and the second post 33. Then an electrostatic attraction is generated between the micro mirror 10 and the address electrodes 20 having different voltage. Due to the electrostatic attraction, the micro mirror 10 is inclined in a predetermined direction. Preferably, a micro mirror device according to the present invention includes a plurality of address electrodes 20. For example, first through fourth address electrodes 20a through 20d may be positioned to respectively correspond to the corners of the micro mirror 10 when the micro mirror 10 balances itself, i.e., it does not slant in any direction.

Figure 5:
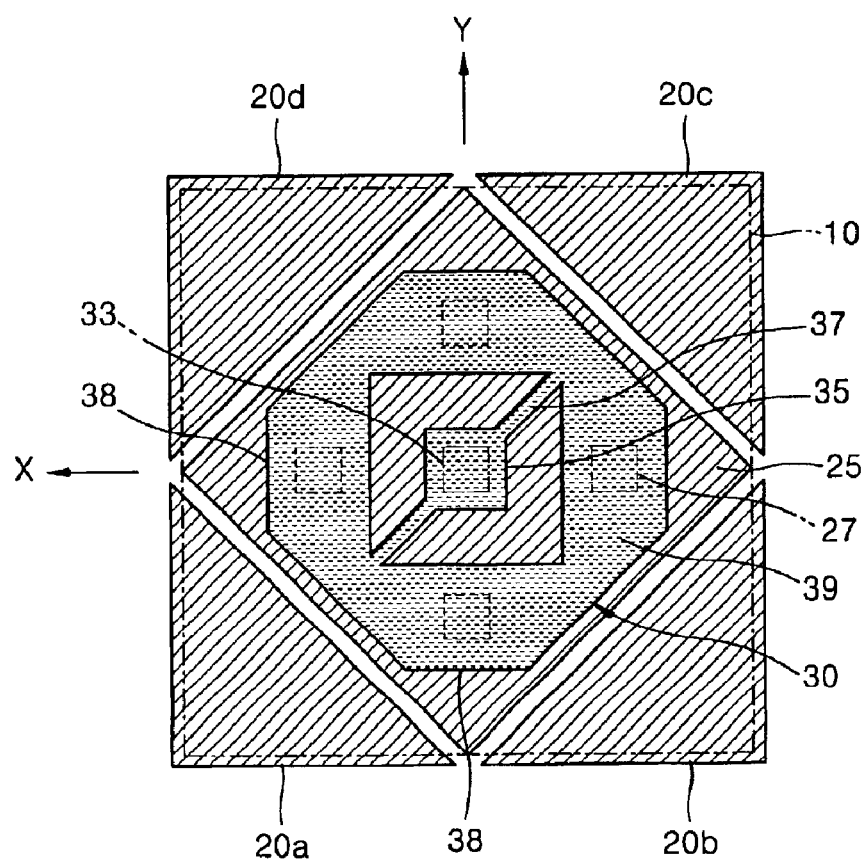
FIG. 5 is a plan view of the micro mirror device of FIG. 3.
Figure 6:
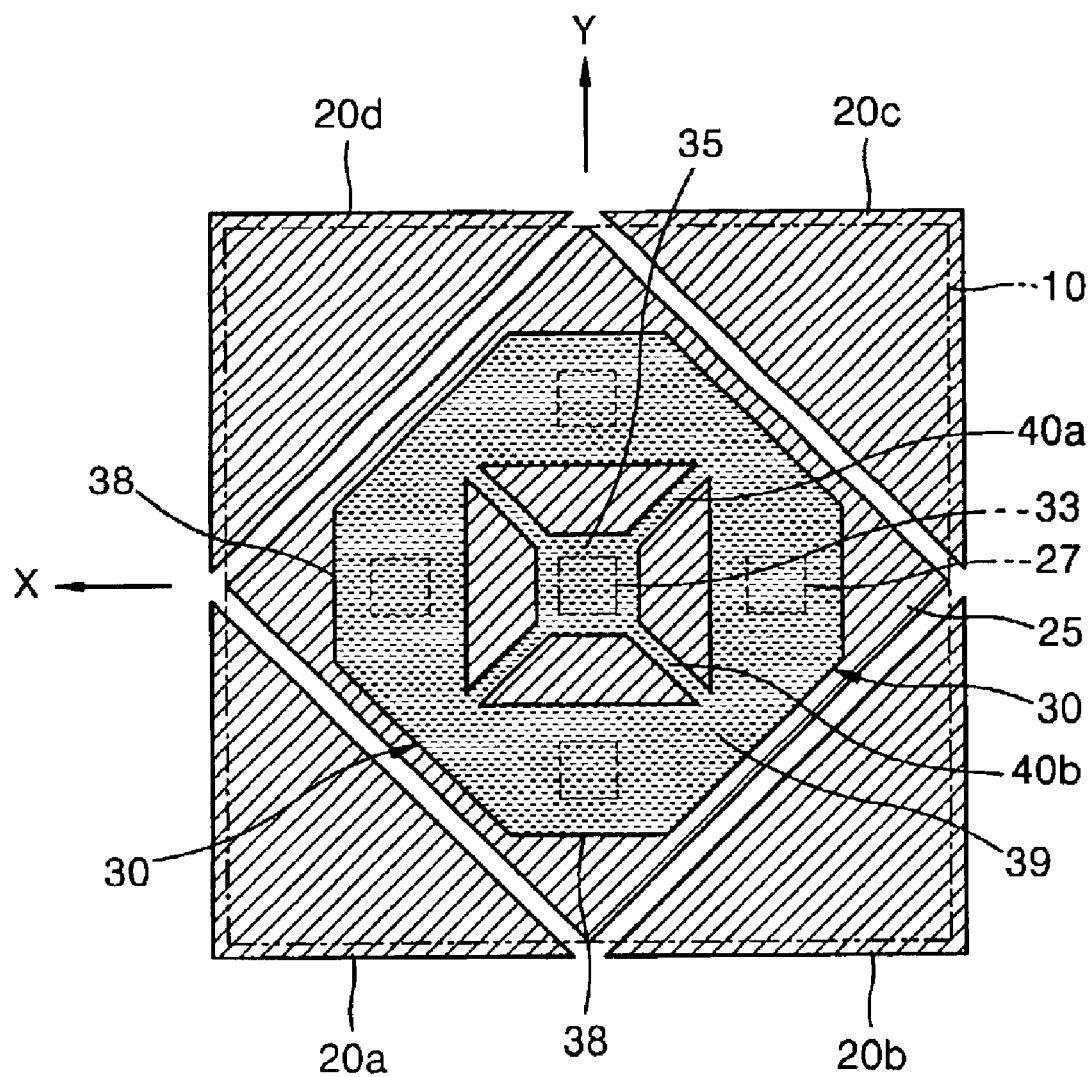
FIGS. 6 through 8 are arrangement plans of a spring hinge included in a micro mirror device according to a second embodiment of the present invention.

Also, at least one spring hinge 37 may be positioned in the diagonal direction of the micro mirror 10 with regard to the central portion 35 as illustrated in FIGS. 5 and 6.

In the operations of a micro mirror device according to the present invention, SRAMs is included in the substrate 1, and voltage is selectively applied to the first through fourth address electrodes 20a through 20d in response to an image signal output from the SRAMs. For instance, predetermined voltage is applied to the first and second address electrodes 20a and 20b, and voltage whose intensity is different from the predetermined voltage is applied to the bias electrode 25. Then, an electrostatic attraction is generated between the micro mirror 10 and the first address electrode 20a, due to a voltage difference between the first and second address electrodes 20a and 20b, and the bias electrode 25. Therefore, as can be seen from FIG. 4, the micro mirror 10 leans toward the first and second address electrodes 20a and 20b. At this time, the spring hinges 37 transform elastically, which makes the micro mirror 10 be inclined in a predetermined direction. Here, the direction that the micro mirror 10 is inclined is determined by the intensity of the generated electrostatic attraction and the characteristics of the spring hinge 37, and the micro mirror 10 is kept to have a predetermined angle θ by the stopper 38. Meanwhile, the first and second address electrodes 20a and 20b and the bias electrode 25 are given the same voltage, and therefore, the same electric potential is formed therebetween. Thus an electrostatic attraction disappears among the first and second address electrodes 20a and 20b, and the bias electrode 25. As a result, due to the restoring force of the spring hinge 37, the micro mirror 10 returns back to its original position, i.e., it balances itself. Similarly, it is possible to slant the micro mirror 10 in all directions by selectively applying voltage selectively to the first through fourth address electrodes 20a through 20d. At this time, preferably, the spring hinge 37 is positioned such that its restoring force, i.e., torsion and tension, affects the micro mirror 10 regardless of the direction that the micro mirror 10 is inclined.

Figure 7:
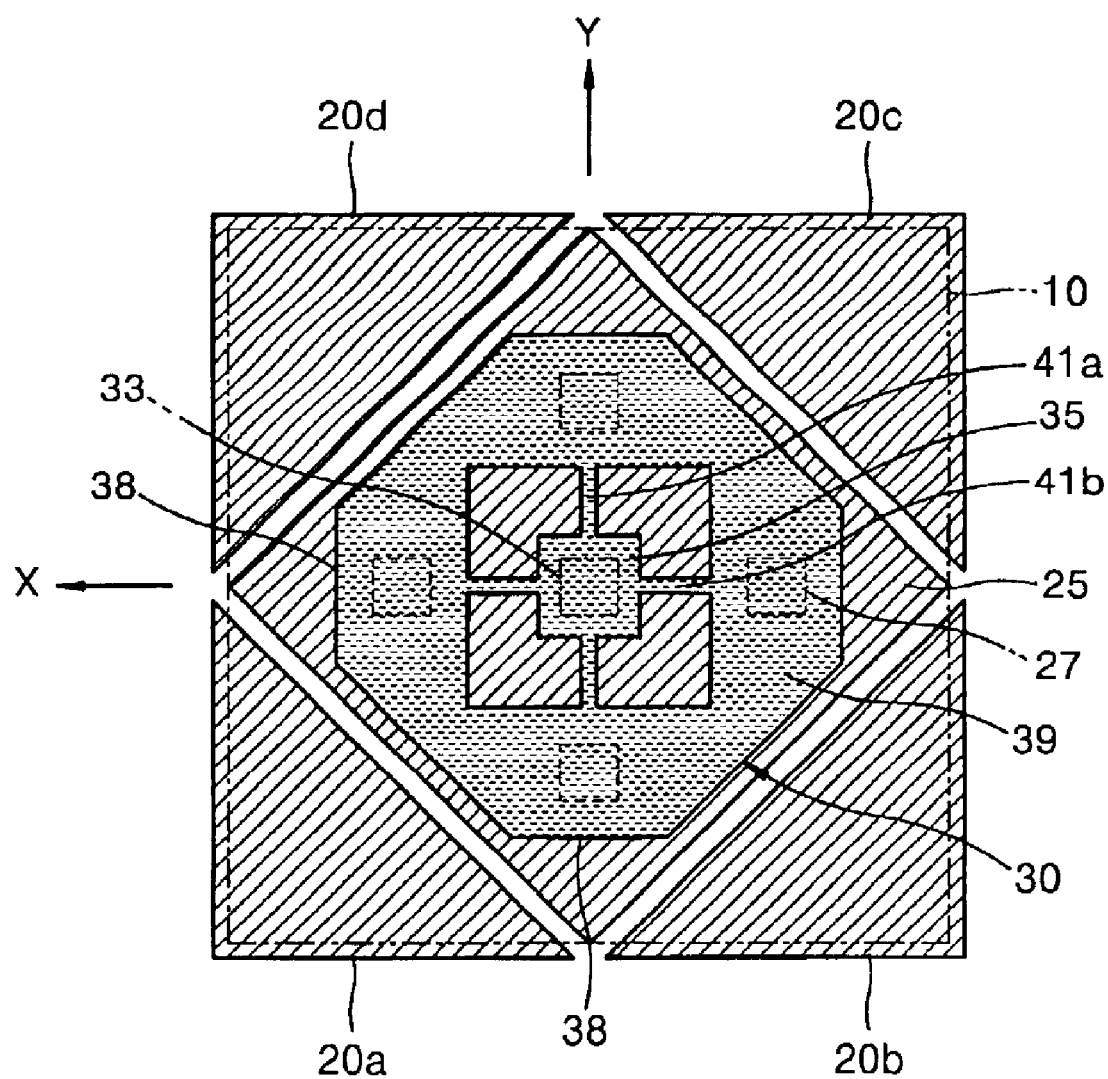
Figure 8:
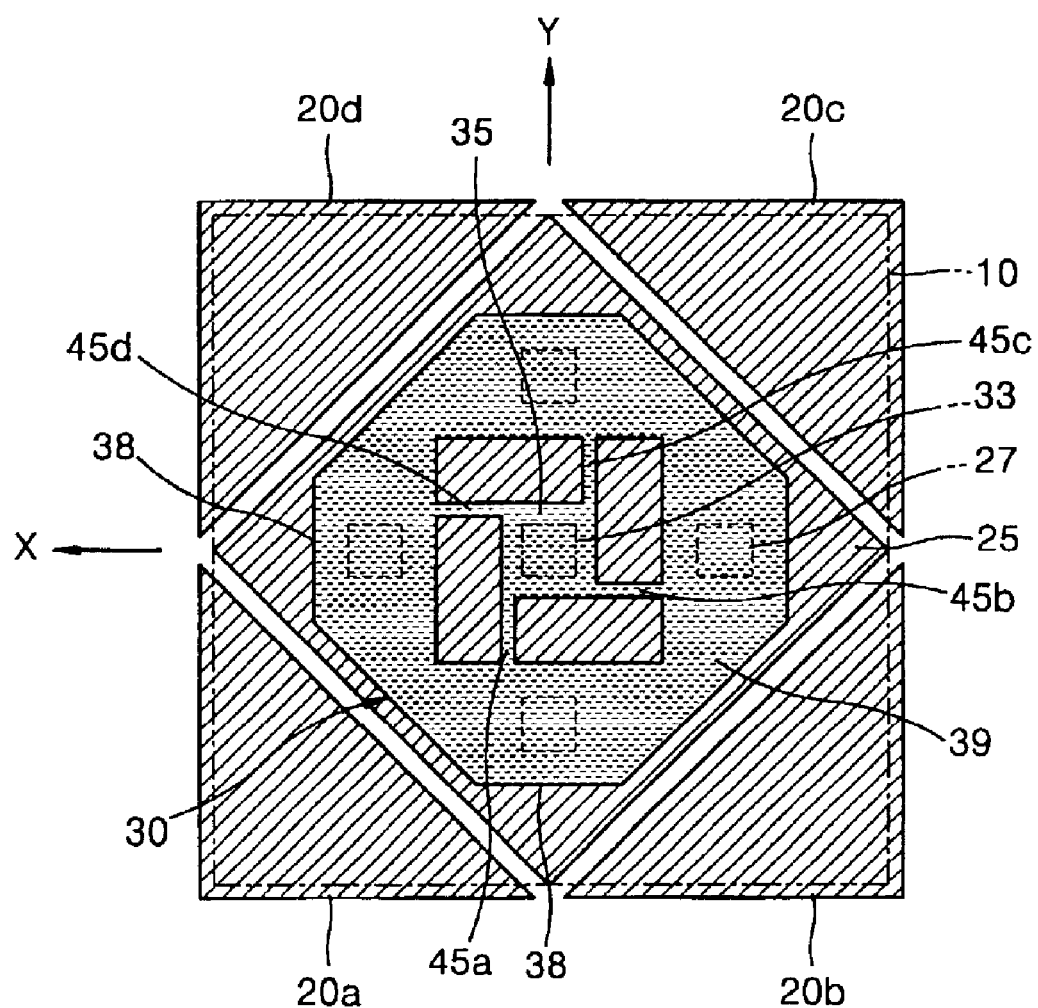

Referring to FIG. 5, a micro mirror device according to the present invention includes one spring hinge 37 in the diagonal direction of the micro mirror 10. However, the number and position of spring hinges are not restricted. For example, a micro mirror device according to the present invention may include first and second spring hinges 40a and 40b in the diagonal direction of the micro mirror 10 as shown in FIG. 6, or include third and fourth spring hinges 41a and 41b parallel to the sides of the micro mirror 10, respectively, as shown in FIG. 7. Otherwise, as shown in FIG. 8, a micro mirror device according to the present invention may include fifth through eighth spring hinges 45a through 45d that extend from each side of the central portion 35 for supporting the second post 33, respectively.

Although spring hinges may be variously positioned with regard to the micro mirror 10, they are aligned to have the same restoring force with regard to a plurality of rotation axes of the micro mirror 10.

Figure 9:
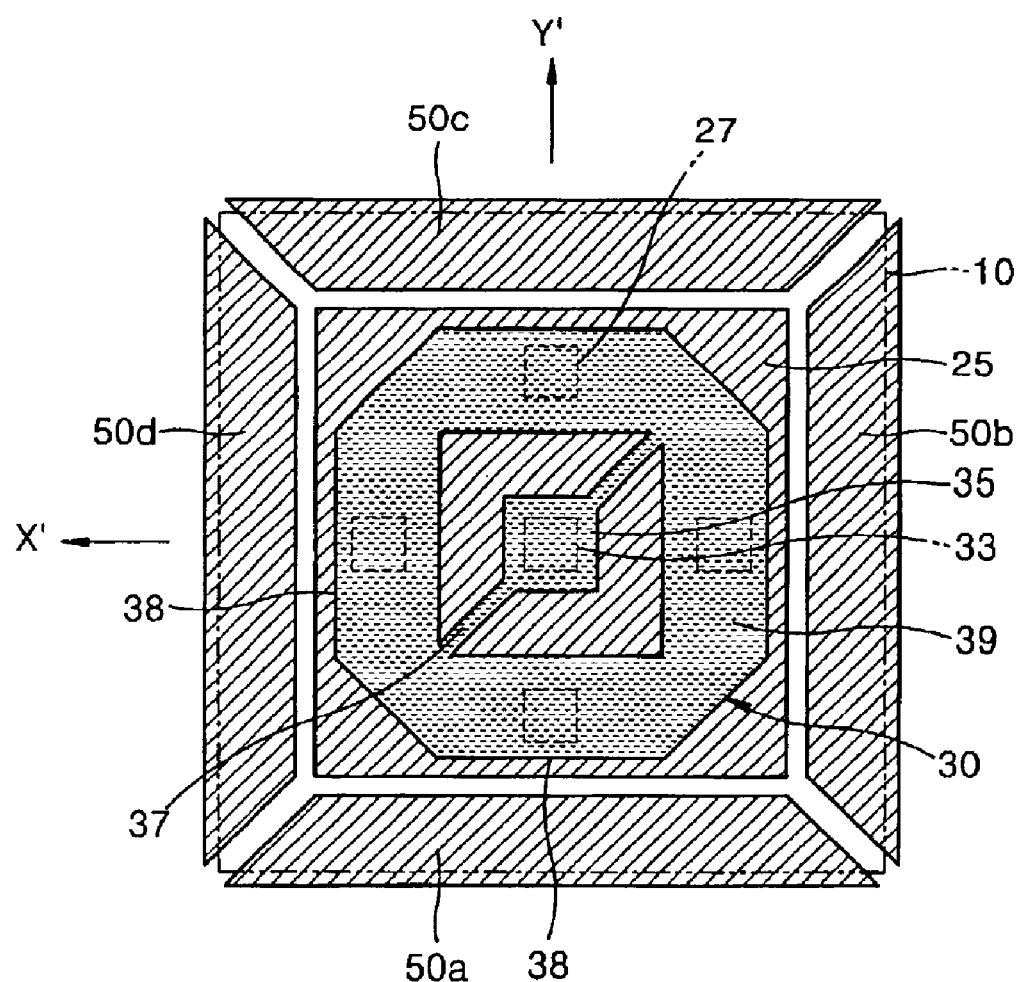
FIG. 9 is a schematic view of the structure of a projector employing a micro mirror device according to the present invention.

Further, the address electrodes 20, i.e., 20a through 20d, are described to be positioned to face each corner of the micro mirror 10. However, as shown in FIG. 9, address electrodes may be positioned to face each side of the micro mirror 10. Referring to FIG. 9, fifth through eighth address electrodes 50a through 50d are positioned in the direction of the sides of the micro mirror 10. In this case, the holding plate 30, which can be variously shaped as described above, can also be used.

In the event that the address electrodes 50a through 50d are aligned in the direction of the sides of the micro mirror 10, the micro mirror 10 is actuated with regard to third and fourth rotation axes X' and Y' which are installed parallel to the sides of the micro mirror 10.

As described above, a micro mirror device according to the present invention can be actuated with regard to a plurality of axes, especially, two axes, which makes it possible to slant a plurality of the micro mirror 10 in all directions. Thus an image is realized by individually slanting a plurality of the micro mirrors 10.

Hereinafter, a projector employing a micro mirror device according to the present invention will be described with reference to FIGS. 10 through 13.

Figure 10:
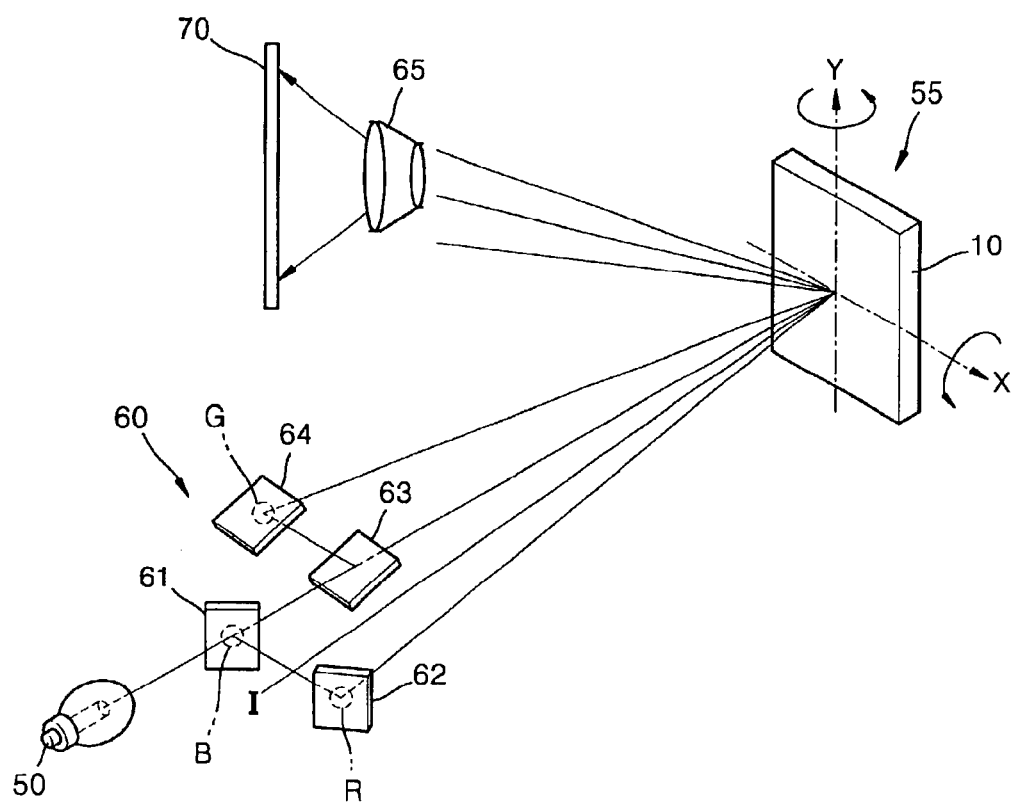
FIGS. 10 through 13 are views explaining the operations of a projector employing a micro mirror device according to the present invention.

Referring to FIG. 10, such a projector includes a light source 50 for illuminating light; a light separator 60 for branching light into several beams according to wavelength regions, and transmitting and/or reflecting the beams at different angles; a micro mirror device 55 for guiding the progressive path of light by focusing and/or emitting light of three colors, i.e., R, G, B beams, which are branched by the light separator 60; and a projection lens unit 65 for magnifying and transmitting light output from the micro mirror device 55 toward a screen 70.

Figure 1:
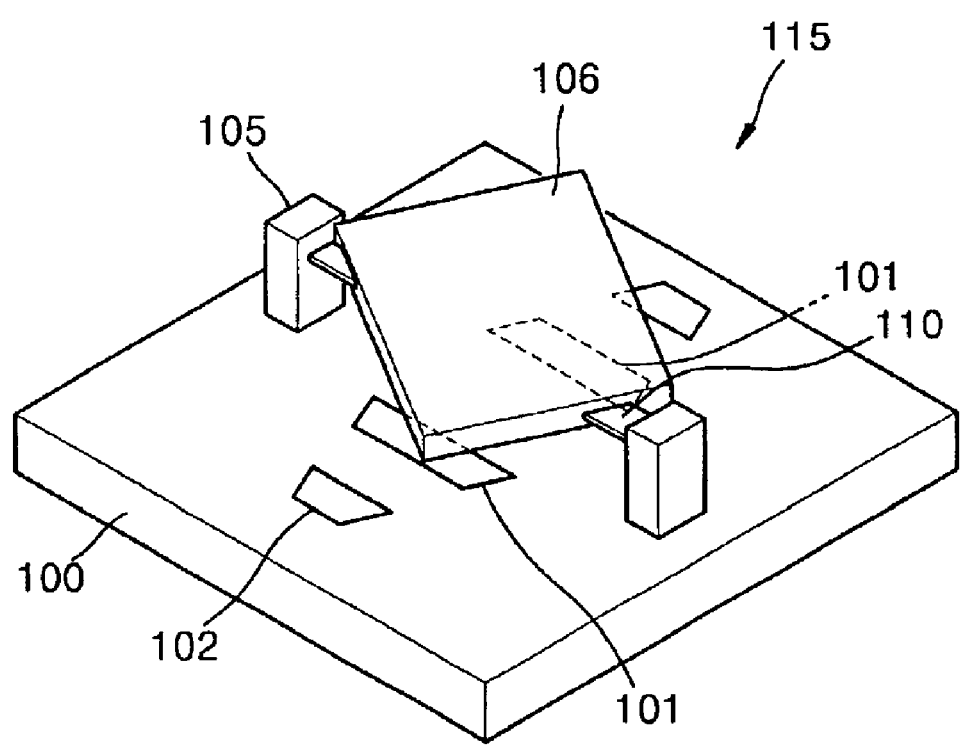
FIG. 1 is a perspective view of a conventional micro mirror device.
Figure 2:
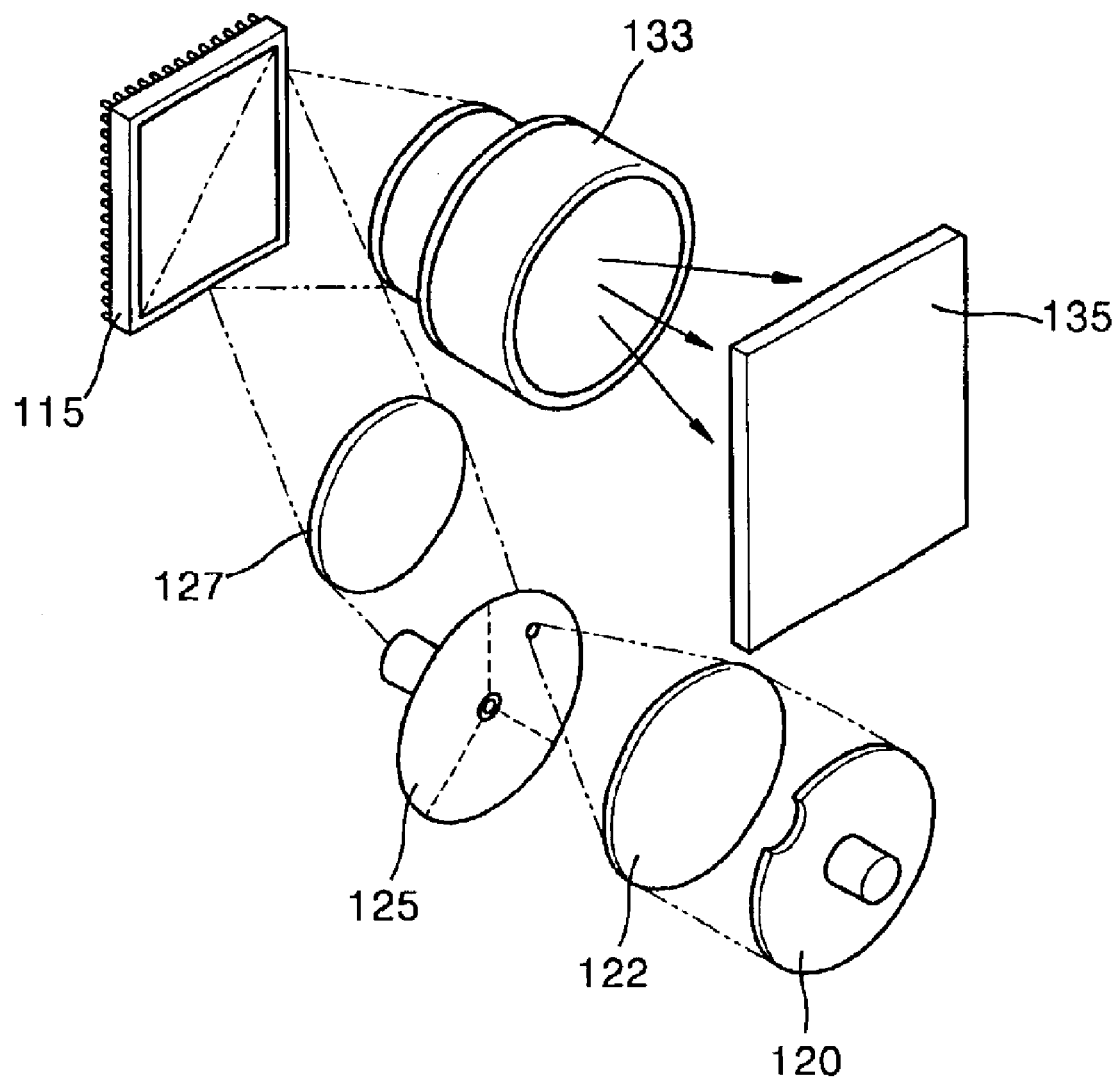
FIG. 2 is a schematic view of the structure of a projector employing the conventional micro mirror device of FIG. 1.

The micro mirror device 55 includes a plurality of micro mirrors 10 that are two dimensionally arranged to be actuated individually in response to image signals. The structure and functions of each of the micro mirrors 10 are as described above. Thus the operations of one micro mirror 10 will now be described here. In the case of the conventional micro mirror device 115 shown in FIG. 1, the micro mirror 106 includes one rotation axis, and is switched 'on' or 'off' for each color. Thus, the color wheel 125 of FIG. 2 is not required to realize color images. In contrast, the micro mirror 10 according to the present invention has a plurality of axes, especially, two axes, and thus the micro mirror 10 can slant in all directions, i.e., right and left, and upper and lower directions. For this reason, the micro mirror device 55 according to the present invention is capable of realizing color images without the color wheel 125.

The light separator 60 separates light output from the light source 50 into beams of R,G,B colors according to the wavelength regions, and includes first and second dichroic mirrors 61 and 63, and first and second total reflection mirrors 62 and 64. For instance, the first dichroic mirror 61 may be a mirror for reflecting a red (R) beam. Thus the first dichroic mirror 61 reflects a beam corresponding to an R wavelength region toward the first total reflection mirror 62, but transmits beams corresponding to a green (G) or blue (B) wavelength region. Also, the second dichroic mirror 63 may be, for example, a mirror for reflecting G beam and propagating R and B beams. Thus when the G and B beams, which propagate the first dichroic mirror 61, are incident upon the second dichroic mirror 63, the G beam is reflected toward the second total reflection mirror 64, but the B beams propagates the second total reflection mirror 64.

Accordingly, the R beam, the G beam, and the B beam are incident upon the micro mirror device 55 by the first total reflection mirror 62, the second total reflection mirror 64, and the second dichroic mirror 63, respectively. As a result, the R, G, B lights are selectively incident upon the projection lens unit 65 according to the different incident angles of the R, G, B beams, and the corresponding inclination angles of the micro mirror 10, thereby realizing a color image.

Figure 11:
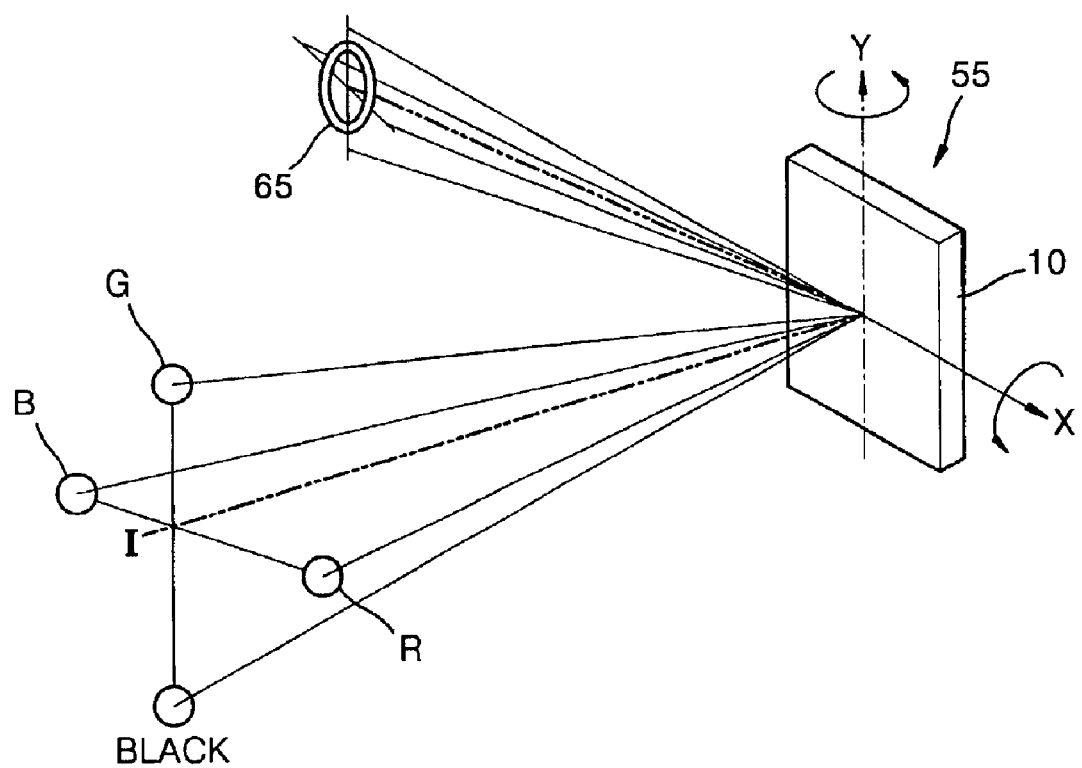

FIG. 11 is a view illustrating a micro mirror device 55 capable of realizing a color image. For convenience' sake, the micro mirror device 55 will now be explained taking an emphasis on the micro mirror 10. Here, 'R', 'G', and 'B' denote starting points of light emitted from the second dichroic mirror 63 and the first and second total reflection mirror 62 and 64, respectively, and 'BLACK' denotes a reference point used in determining an inclination of the micro mirror 10 for forming a black image. In the event that the micro mirror 10 does not slant with regard to a predetermined reference axis 1, no R, B, B beams are transmitted to the projection lens unit 65.

Figure 12:
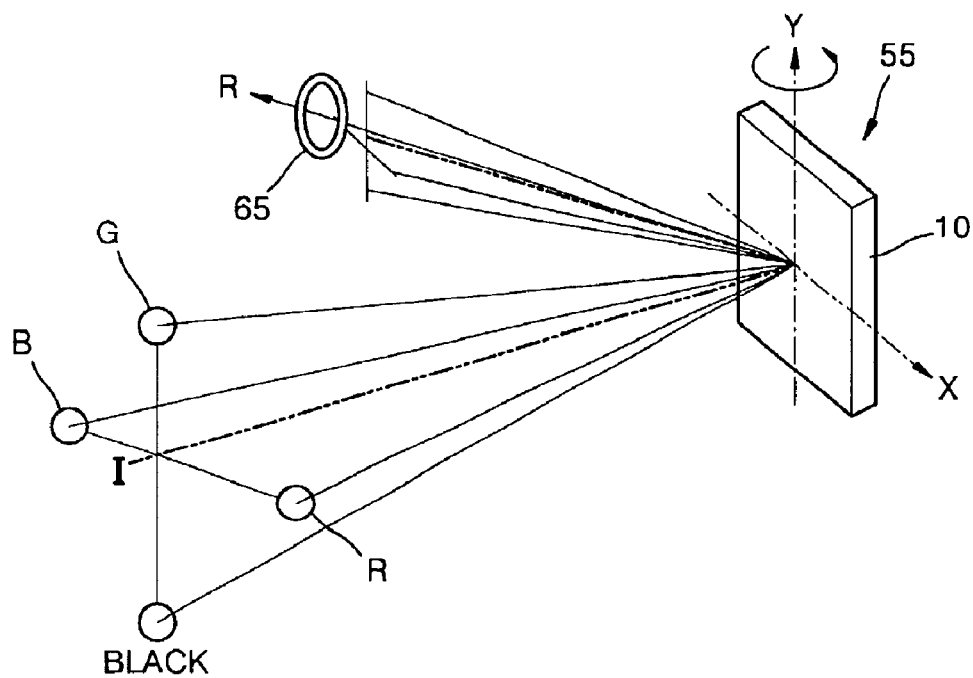

Referring to FIG. 12, when the micro mirror 10 slants in the opposite direction of an arrow with regard to an Y axis, only R beam is transmitted to the projection lens unit 65, and the other G, B, BLACK beams go out of the projection lens unit 65. As a result, a red image is realized. On the other hand, if the micro mirror 10 slants in the direction of the arrow with regard to the Y axis, only B beam is transmitted to the projection lens unit 65, and the other R, G beams go out of the projection lens unit 65, thereby realizing a blue image.

Figure 13:
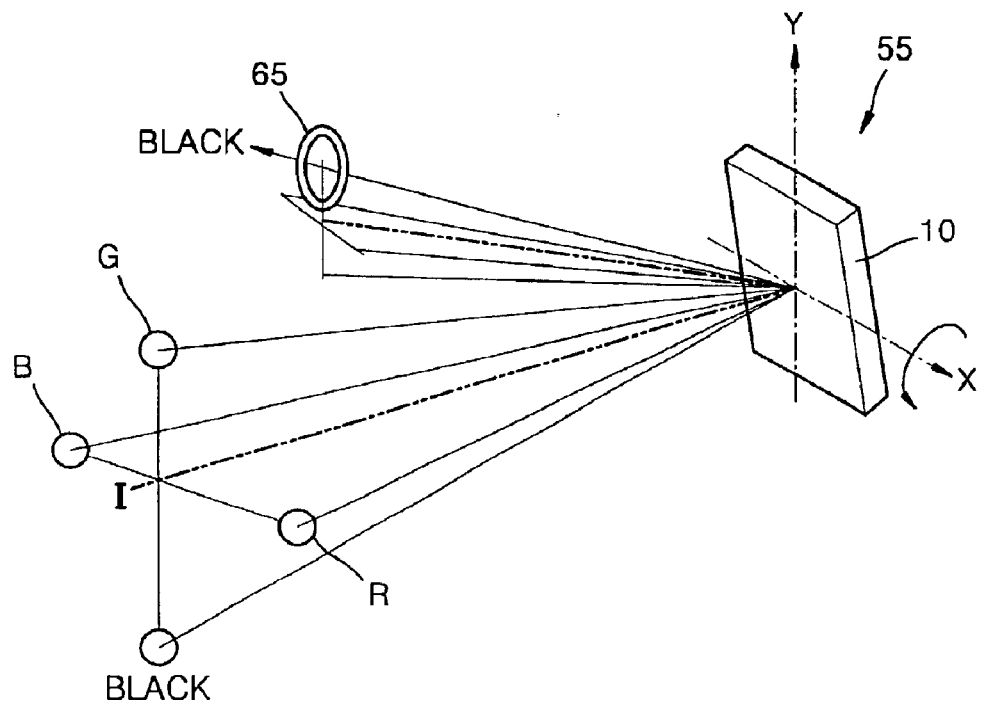

Referring to FIG. 13, when the micro mirror 10 slants in the direction of an arrow with regard to an X axis, other surface reflection light as well as R, G, B beams are not transmitted to the projection lens unit 65, thereby realizing a black image. If the micro mirror 10 slants in the opposite direction of the arrow with regard to the X axis, a green (G) image is realized.

As previously mentioned, in a micro mirror device according to the present invention, the micro mirror 10 can slant in all directions by selectively applying voltage to the address electrodes 20a, 20b, 20c, 20d, 50a, 50b, 50c and 50d with regard to at least two rotation axes. Therefore, it is possible to selectively realize an R, G or B image depending on which direction the micro mirror 10 is inclined.

While the present invention has been particularly shown and described with reference to a preferred embodiment thereof, it will be understood by those skilled in the art that various changes in form and details may be made therein without departing from the spirit and scope of the invention as defined by the appended claims.

In conclusion, a micro mirror device and a projector employing the same according to the present invention is capable of realizing color images adopting one panel, without a color wheel. Therefore, noise or vibration caused due to the rotation of the color wheel at high speed can be prevented, and manufacturing costs is reduced. Also, there is no worry about light escaping from an edge of the color wheel, thereby reducing energy consumption. For these reasons, a micro mirror device and a projector according to the present invention can be applied to portable devices.

What is claimed is:

1. A micro mirror device capable of individually controlling a plurality of micro mirrors, the micro mirror device comprising:
   a substrate;
   a plurality of address electrodes formed on the substrate, and a bias electrode for making the micro mirrors slant with regard to a plurality of rotation axes, together with the address electrodes; and
   a holding plate including a rigid portion having a polygonal or round shape and held by first posts which are formed on the bias electrode, a central portion for supporting a second post that supports the micro mirrors and at least one spring hinges transforming elastically when the micro mirrors slant with regard to the rotation axes, the holding plate held by first posts which are formed on the bias electrode, and the rigid portion enclosing the central portion.

2. The micro mirror device of claim 1, wherein the address electrodes are aligned to face each corners of the micro mirrors.

3. The micro mirror device of claim 2, wherein at least one spring hinge is positioned in the diagonal direction of the micro mirror with regard to the central portion in the diagonal direction of the micro mirror.

4. The micro mirror device of claim 2, wherein at least one spring hinge is positioned parallel to each side of the micro mirror with regard to the central portion.

5. The micro mirror device of claim 4, wherein spring hinges extend from each side of the central portion.

6. The micro mirror device of claim 2, wherein the holding plate comprises stoppers for preventing the inclination of the micro mirror beyond a predetermined angle.

7. The micro mirror device of claim 1, wherein at least one spring hinge is positioned in the diagonal direction of the micro mirror with regard to the central portion.

8. The micro mirror device of claim 1, wherein at least one spring hinge positioned parallel to a side of the micro mirror with regard to the central portion.

9. The micro mirror device of claim 1, wherein the holding plate includes stoppers for preventing the inclination of the micro mirror beyond a predetermined angle.

10. The micro mirror device of claim 1, wherein the address electrodes are positioned parallel to each side of the micro mirror.

11. The micro mirror device of claim 10, wherein at least one spring hinge is positioned in the diagonal direction of the micro mirror with regard to the central portion.

12. The micro mirror device of claim 10, wherein at least one spring hinge is positioned parallel to a side of the micro mirror with regard to the central portion.

13. The micro mirror device of claim 12, wherein the spring hinges extend from the sides of the central portion.

14. The micro mirror device of claim 10, wherein the holding plate comprises stoppers for preventing the inclination of the micro mirror beyond a predetermined angle.

15. A micro mirror device capable of individually controlling a plurality of micro mirrors, the micro mirror device comprising:
   a substrate;
   a plurality of address electrodes formed on the substrate, and a bias electrode for making the micro mirrors slant with regard to a plurality of rotation axes, together with the address electrodes; and
   a holding plate including a rigid portion held by first post which are formed on the bias electrode, a central portion for supporting a second post that supports the micro mirror, at least one spring hinge connected between the rigid portion and the central portion, the spring hinge transforming elastically when the micro mirror slants with regard to a plurality of rotation axes, and the rigid portion enclosing the central portion.

16. The micro mirror device of claim 15, wherein the address electrodes are aligned to face each corners of the micro mirror.

17. The micro mirror device of claim 16, wherein the at least one spring hinge has the same restoring force with regard to the rotation axes.

18. The micro mirror device of claim 17, wherein at least one spring hinge is positioned in the diagonal direction of or parallel to a side of the micro mirror.

19. The micro mirror device of claim 18, wherein the spring hinges extend from each side of the central portion.

20. The micro mirror device of claim 18, wherein the holding plate comprises stoppers for preventing the inclination of the micro mirror beyond a predetermined angle.

21. The micro mirror device of claim 15, wherein the address electrodes are aligned to face each side of the micro mirror.

22. The micro mirror device of claim 21, wherein at least one spring hinge is positioned in the diagonal direction of or parallel to a side of the micro mirror.

23. The micro mirror device of claim 22, wherein the spring hinges extend from each side of the central portion.

24. The micro mirror device of claim 22, wherein the rigid portion is polygonal shaped.

25. The micro mirror device of claim 24, wherein the rigid portion comprises stoppers for preventing the inclination of the micro mirror beyond a predetermined angle.

26. A projector comprising:
   a light source for illuminating light;
   a light separator for branching light output from the light source into several beams according to a wavelength region, and reflecting or transmitting the beams at different angles;
   a micro mirror device for forming an image by rotating a micro mirror, which slants with regard to a plurality of rotation axes, in a predetermined direction or at a predetermined angle, and by selectively reflecting the beams separated from the light separator; and
   a projection lens unit for magnifying and transmitting beams output from the micro mirror device, so that the beams travel toward a screen,
   wherein the micro mirror device comprises:
      a substrate:
      a plurality of micro mirrors operating individually;
      a plurality of address electrodes formed on the substrate;
      a bias electrode for making the micro mirrors slant with regard to a plurality of rotation axes, by the interaction with the address electrodes; and
      a holding plate including a rigid portion and held by first posts which are formed on the bias electrode, a central portion for supporting a second post that supports the micro mirror, and at least one spring hinge connected between the rigid portion and the central portion, the spring hinge transforming elastically when the micro mirror slant with regard to the rotation axes, and the rigid portion enclosing the central portion.

27. The projector of claim 26, wherein the address electrodes are aligned to face each corner of the micro mirror.

28. The projector of claim 27, wherein at least spring hinge is positioned in the diagonal direction of or parallel to a side of the micro mirror.

29. The projector of claim 28, wherein the spring hinges extend from each side of the central portions.

30. The projector of claim 28, wherein the rigid portion comprises stoppers for preventing the inclination of the micro mirror beyond a predetermined angle.

31. The projector of claim 26, wherein the address electrodes are aligned to face each side of the micro mirror.

32. The projector of claim 31, wherein at least one spring hinge is positioned in the diagonal direction of or parallel to a side of the micro mirror with regard to the central portion.

33. The projector of claim 32, wherein the spring hinges extend from each side of the central portion.

34. The projector of claim 32, wherein the rigid portion comprises stoppers for preventing the inclination of the micro mirror beyond a predetermined angle.

35. The projector of claim 26, wherein at least one spring hinge is positioned in the diagonal direction of or parallel to a side of the micro mirror with regard to the central portion.

* * * * *